Figure 1:
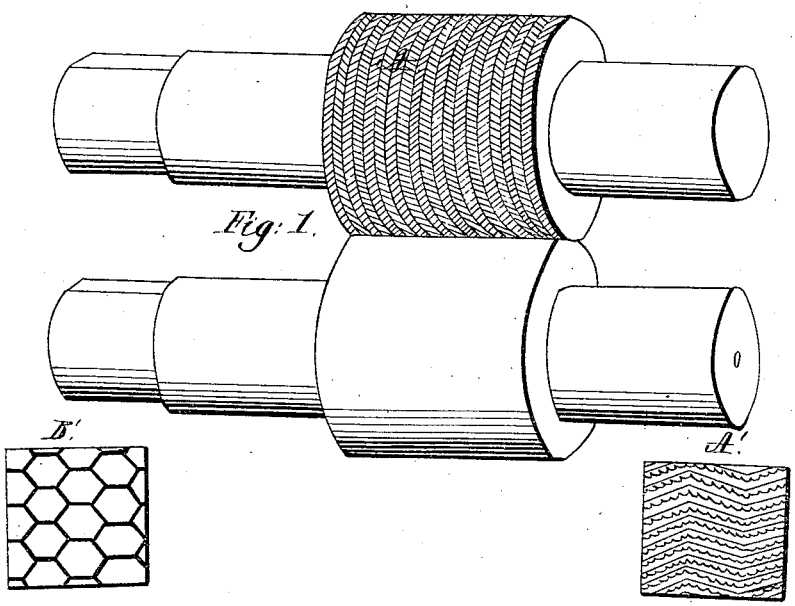

Halsey & Fitzgibbons.
Making Hard Rubber Articles.
Nº 53,922. Patented Apr. 10, 1866.

Witnesses:
S. L. Law
Fred. B. Sears

Inventors:
Wm. H. Halsey
W. Fitzgibbons

UNITED STATES PATENT OFFICE.

WILLIAM H. HALSEY, OF HOBOKEN, NEW JERSEY, AND MAURICE FITZ-GIBBONS, OF NEW YORK, N. Y., ASSIGNORS TO DAVID N. ROPES, OF ORANGE, NEW JERSEY.

IMPROVED METHOD OF TREATING HARD RUBBER OR GUTTA-PERCHA FOR ARTICLES OF DRESS AND OTHER USES.

Specification forming part of Letters Patent No. 53,922, dated April 10, 1866.

*To all whom it may concern:*

Be it known that we, WILLIAM H. HALSEY, of Hoboken, New Jersey, and MAURICE FITZGIBBONS, of the city and State of New York, have invented a new and Improved Mode or Method of Treating and Preparing Hard India-Rubber or Gutta-Percha for Articles of Dress and other Uses; and we do hereby declare that the following is a full, clear, and exact description thereof, reference being had to the accompanying drawings, and to the letters of reference marked thereon, and making a part of this specification.

The nature or character of our invention consists in a new mode or method of treating and preparing hard india-rubber or gutta-percha, by which such material is made to resemble woven and figured stuffs, as watered silks, &c., and is thereby adapted to be made use of in the place of such stuffs and fabrics in articles of dress, and for other purposes.

Various efforts have been heretofore made to apply hard rubber and gutta-percha to the construction of different articles of wearing apparel, and to uses to which woven stuffs have heretofore been more particularly applied; but such efforts have proved practically unsuccessful, principally because of the uniformity of surface and sameness of appearance, and consequent want or absence of beauty such articles necessarily had when made of such material, and because of the tendency of such articles to grow dull and lusterless, thus making them appear common and cheap.

By our invention, however, the surface of such material can be made to resemble woven or figured stuffs, as watered silks and other manufactured goods, and can be given a very great variety of patterns, thereby giving to any articles which may be made from such material when so treated or prepared the same appearance and beauty as if made from woven stuffs, thus securing variety and elegance of appearance in the place of uniformity and sameness.

Our invention consists in subjecting hard rubber or gutta-percha, after it has been reduced to a thinness suitable for the use to which it is to be applied, whether for articles of dress or for other uses, to the action, two or more times, of pressure rolls, the surfaces of which are cut or covered with suitable patterns, and which are made of hardened steel and roll close together, so that as such material is passed between them its surface will permanently receive the impression of the rolls.

The pattern or design upon the roll may be varied almost indefinitely, and the variety of surface given to the rubber or gutta-percha may be increased to an inconceivably greater degree, as every time the material is passed between rolls, even of the same pattern, its appearance will be changed by the crossing of the lines on the rolls with those already made or impressed upon the material. The surface of the material may be still further varied in appearance by passing the same piece between rolls of different patterns or designs. The extent or variety of appearance and pattern that can be so given to the surface of such material is thus, in fact, unlimited.

As it is intended to pass the material more than once between the figured rolls, the pattern or design upon the face of the rolls should not be a large complicated one having its several portions varied and unlike each other, but the design or pattern upon the rolls should consist or be made up of fine lines, and generally repeated in form or position over the surface of the roll, so as to better allow or permit the surface of the material to be varied and changed by the crossing, in different directions, of the lines on the roll upon and with those before impressed upon the material.

For ordinary uses and applications it will not be necessary or desirable to figure or beautify but one side of the material, and therefore but one roll of any pair or set will require to have a figured surface.

The drawings illustrate rolls suitable for so figuring and embellishing but one side of the material, and show two figured rolls, each having a different pattern or device.

The roll A, Figure 1, has a kind of chevroned surface, or a surface covered with zigzag lines, between which a honey-comb cutter or tool is afterward passed, giving to the roll a surface or pattern substantially like that shown by the enlarged section A'.

Figure 2:
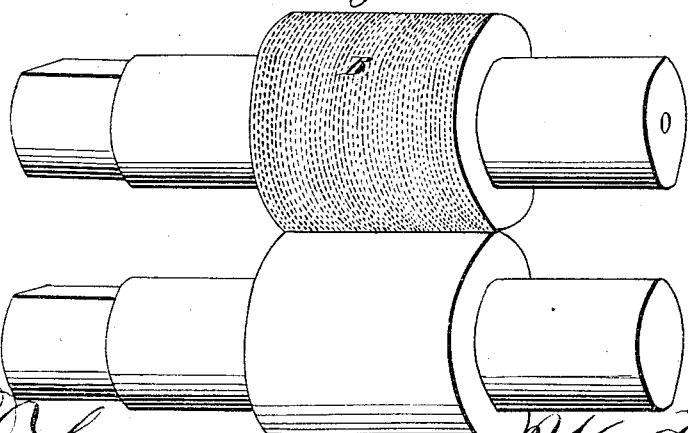

The roll B, Fig. 2, has its surface cut in what is called a "honey-combed" pattern, like that shown in enlarged section at B'. The lower rolls, against which these act, have smooth surfaces. Whenever it is desirable or necessary for any purpose to give to both sides of the material a figured or ornamented appearance, the surfaces of both rolls in any pair will be figured.

Hard rubber or gutta-percha, when so prepared or figured, whether upon one or both surfaces, is peculiarly adapted for hat and cap bands, for belts, cuffs, collars, neckties, bows, and for very many other uses and applications, and for trimmings for ladies' dresses, bonnets, &c., to any and all which uses or applications it would be but poorly adapted, if at all suitable, if the natural plain and uniform surface of the rubber was apparent, thereby giving sameness of appearance to all articles made from it.

We are aware that hardened rolls having designs or figures upon their surfaces have been made use of to impress or transfer such designs or figures upon a softer material, for the purpose of printing therefrom or for similar uses; but in such cases such rolls have been designedly prepared and so operated or used as to transfer upon the softer material the particular design upon the rolls without change or variation, and have not been so made and constructed as to render it possible to produce from their use different and varying impressions or figures upon the surface of the softer material by successive or repeated impressions of the rolls.

What we claim as our invention, and desire to secure by Letters Patent, is—

The process, substantially as herein described, which consists of subjecting hard rubber, gutta-percha, or other similar material to two or more successive pressures of figured rolls, substantially as and for the purposes above described.

WM. H. HALSEY.
M. FITZGIBBONS.

Witnesses:
S. D. LAW,
FRED. B. SEARS.